Jan. 28, 1930.  D. O. DEVER  1,745,083
DIMMER FOR AUTOMOBILE HEADLIGHTS
Filed Aug. 20, 1928
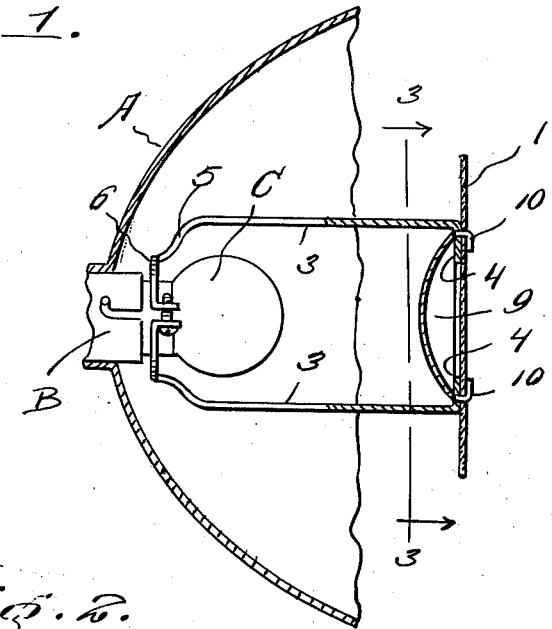
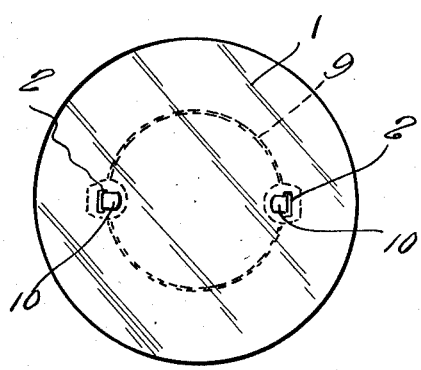
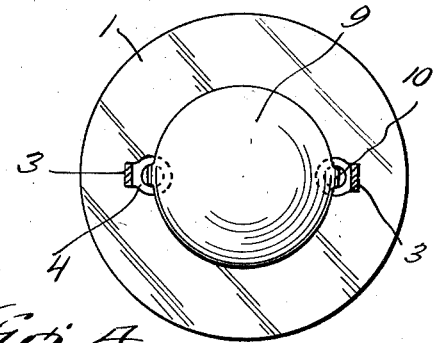
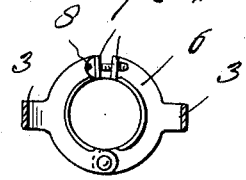
Inventor
D. O. Dever,
By Clarence A. O'Brien
Attorney Patented Jan. 28, 1930

1,745,083

UNITED STATES PATENT OFFICE

DAN O. DEVER, OF LOS ANGELES, CALIFORNIA, ASSIGNOR OF FIFTY-FIVE PER CENT TO VIRGIL DEAVER, OF ESCONDIDO, CALIFORNIA

DIMMER FOR AUTOMOBILE HEADLIGHTS

Application filed August 20, 1928. Serial No. 300,738.

This invention pertains to improvements in dimmers for automobile headlights and has a more particular reference to those types of dimmers located within the headlight casing for diffusing the light rays before they reach the usual lens.

The aim of the present invention is to provide an anti-glare device for automobile headlights for effectively reducing the usual blinding glare of undimmed headlights without impairing the beam of light projected therefrom.

An important object of the invention resides in providing an anti-glare device of such simple construction as to permit the manufacture thereof at a reasonably low cost, and which is capable of being easily mounted within the usual headlight structure.

Another object of the invention resides in the provision of a device of the above character, wherein fastening means are employed, permitting the mounting or demounting of the same without interfering with the bulb of the headlight.

Still another object is to provide a light dimming device for headlights wherein a mirror is employed for disposition immediately in front of the usual bulb for deflecting the strong light rays toward the usual headlight reflector, while a sheet of light diffusing material is secured to the mirror for diffusing light rays projected beyond the perimeter of the mirror.

After considering the following specification and claim other important objects and advantages of the invention will become apparent.

In the drawings:

Figure 1 is a fragmentary sectional view of a conventional headlight casing showing the present invention in partial section and secured to the usual bulb located within the headlight socket.

Figure 2 is a front side elevation of the improved device.

Figure 3 is a vertical sectional view, taken substantially on the line 3—3 of Figure 1, and Figure 4 is a similar sectional view, looking in the opposite direction toward the clamping means.

Referring to the drawings, wherein like numerals designate like parts, a conventional headlight casing A is provided with the usual bulb socket B. For the purpose of illustrating the manner of applying the present invention, a conventional bulb C is shown secured within the socket B.

In carrying out the present invention, a discular piece of light diffusing material 1 is formed with a pair of diametrically spaced openings 2—2.

A pair of elongated arms 3—3 are each bent at one of their ends to provide feet 4. The opposite end portions of the arms 3—3 are disposed laterally as at 5.

Each of the end portions 5 are connected to the intermediate portions of arcuate shaped plates 6. These plates 6 are pivotally connected together at one of their ends while their opposite ends are bent laterally to provide lugs 7. The set screw 8 is threadable through the lug 7 in the manner shown in Figure 4.

A concavo-convex shaped plate 9 is mirrored on its convex surface, while a pair of lugs 10—10 projecting from the periphery thereof are engageable through openings in the legs 4 of the arms 3—3 and the openings 2—2 of the disc 1. The end portions of these lugs 10—10 being disposed in the manner above described, are bent inwardly against the outer face of the disc 1, for firmly securing these elements together.

Obviously by removing the set screw 8, the arcuate plates 6 may be spread apart and engaged around the base portion of the usual bulb C. The set screw 8 may then be threaded through the lugs 7, for clamping these plates 6 against the base of the bulb. The mirrored plate 9 will then be supported immediate in front of the bulb, while the edge portion of the disc 1 will project radially from the periphery thereof. Obviously, the strong light rays emanating from the bulb C will be deflected by the silvered surface of the mirror 9.

The edge portion of the disc 1 will serve to diffuse any light rays not deflected by the mirrored plate 9, and which may escape from the headlight without deflection.

Having thus described my invention, what is claimed is:

An anti-glare device for headlights comprising a bulb engageable frame, said frame being adapted for disposition within the usual headlight casing, a light diffusing plate on the forward end of the frame, a mirror at the forward end of the frame, said frame being provided with openings at the forward end thereof, lugs on the said mirror, said light diffusing plate being provided with openings for registry with the openings on the adjacent end of the frame, said lugs being adapted for disposition through the registering openings, and adapted to be bent laterally for securing the said mirror and light diffusing plate to the frame.

In testimony whereof I affix my signature.

DAN O. DEVER.